(12) United States Patent
Kolundzija et al.

(10) Patent No.: US 12,361,954 B2
(45) Date of Patent: Jul. 15, 2025

(54) AMBIENCE-ADAPTED AUDIO WATERMARKING FOR TELECONFERENCING

(71) Applicant: Cisco Technology, Inc., San Jose, CA (US)

(72) Inventors: Mihailo Kolundzija, Lausanne (CH); Raul Alejandro Casas, Doylestown, PA (US); Hua Mu, Orlando, FL (US); Marek Jacek Adamiec, Gdańsk (PL)

(73) Assignee: CISCO TECHNOLOGY, INC., San Jose, CA (US)

( * ) Notice: Subject to any disclaimer, the term of this patent is extended or adjusted under 35 U.S.C. 154(b) by 244 days.

(21) Appl. No.: 18/327,353

(22) Filed: Jun. 1, 2023

(65) Prior Publication Data

US 2024/0404534 A1 Dec. 5, 2024

(51) Int. Cl.
  *G10L 19/018* (2013.01)
  *H04B 1/69* (2011.01)
  *H04R 3/00* (2006.01)
  *H04R 29/00* (2006.01)

(52) U.S. Cl.
  CPC ............. *G10L 19/018* (2013.01); *H04B 1/69* (2013.01); *H04R 3/00* (2013.01); *H04R 29/001* (2013.01)

(58) Field of Classification Search
  CPC ....... G10L 19/018; H04R 3/005; H04R 3/007; H04R 3/002; H04R 29/001; H04R 29/004; H04R 29/005
  USPC ...................................................... 381/59, 83
  See application file for complete search history.

(56) References Cited

U.S. PATENT DOCUMENTS

| | | | |
|---|---|---|---|
| 5,490,170 A | 2/1996 | Akagari et al. | |
| 5,754,427 A | 5/1998 | Akagiri | |
| 8,212,854 B2 | 7/2012 | Marton et al. | |
| 8,505,054 B1 | 8/2013 | Kirley | |
| 9,036,825 B2 | 5/2015 | Nackvi | |
| 9,837,064 B1 | 12/2017 | Hvidsten | |
| 10,026,410 B2 * | 7/2018 | Gurijala | G10L 19/018 |
| 12,106,764 B2 * | 10/2024 | Tu | G10L 19/167 |

(Continued)

OTHER PUBLICATIONS

Kirovski, et al., "Spread-Spectrum Watermarking of Audio Signals," IEEE Transactions on Signal Processing, vol. 51, No. 4, Apr. 2003, pp. 1020-1030.

(Continued)

*Primary Examiner* — Disler Paul
(74) *Attorney, Agent, or Firm* — Edell, Shapiro & Finnan, LLC

(57) ABSTRACT

A method is performed by an endpoint device that includes a loudspeaker, a microphone, and a controller. The method includes: by the loudspeaker, playing a loudspeaker signal into a space; by the microphone, detecting audio in the space, to produce a feedback audio signal; estimating acoustic parameters for the space including a reverberation time and an ambient noise power based on the feedback audio signal and the loudspeaker signal; receiving an incoming audio signal that is not detected by the microphone; using the acoustic parameters, generating an acoustic watermark signal that, when played into the space through the loudspeaker, would be inaudible to a listener; adding the acoustic watermark signal to the incoming audio signal to produce a watermarked audio signal; and playing the watermarked audio signal into the space through the loudspeaker.

20 Claims, 10 Drawing Sheets

(56) References Cited

U.S. PATENT DOCUMENTS

| | | | |
|---|---|---|---|
| 12,249,344 B1* | 3/2025 | Evans | G10L 25/51 |
| 2005/0063552 A1 | 3/2005 | Shuttleworth et al. | |
| 2007/0286430 A1 | 12/2007 | Thomas et al. | |
| 2011/0026724 A1 | 2/2011 | Doclo | |
| 2011/0150257 A1 | 6/2011 | Jensen et al. | |
| 2012/0213380 A1 | 8/2012 | Mahé et al. | |
| 2014/0172435 A1 | 6/2014 | Thiergart et al. | |
| 2016/0073198 A1 | 3/2016 | Vilermo et al. | |
| 2019/0287543 A1 | 9/2019 | Sugai et al. | |
| 2022/0335959 A1 | 10/2022 | Sharma et al. | |
| 2022/0415333 A1* | 12/2022 | Zhu | G10L 25/51 |
| 2023/0030369 A1* | 2/2023 | Tu | G10L 19/018 |
| 2024/0304171 A1* | 9/2024 | Southwell | G10K 11/17823 |

OTHER PUBLICATIONS

Geiger, et al., "Audio Data Hiding With High Data Rates Based on INTMDCT," 2006 IEEE International Conference on Acoustics Speech and Signal Processing Proceedings, May 2006, 4 pages.

Misra, et al., "Acoustical Ranging Techniques in Embedded Wireless Sensor Networked Devices," ACM Transactions on Sensor Networks, vol. 10, Issue 1, Nov. 2013, 40 pages.

Mitchell D. Swanson, et al., "Robust audio watermarking using perceptual masking," Signal Processing, Elsevier, 1997, 19 pages.

Ted Painter, et al., "Perceptual Coding of Digital Audio," Proceedings of the IEEE, vol. 88, No. 4, Apr. 2000, 63 pages.

\* cited by examiner

AMBIENCE-ADAPTED AUDIO WATERMARKING FOR TELECONFERENCING

TECHNICAL FIELD

The present disclosure relates to audio processing.

BACKGROUND

An acoustic watermark embedded in an audio stream such as speech, music, and other audio signals should be inaudible to a listener but have properties that help a decoder to detect the acoustic watermark quickly. When the audio stream is unknown and is transmitted over an acoustic channel having adverse or unfavorable conditions such as high levels of reverberation and background noise, the decoder may not be able to detect the acoustic watermark.

DETAILED DESCRIPTION

Overview

In an embodiment, a method is performed by an endpoint device that includes a loudspeaker, a microphone, and a controller. The method includes: by the loudspeaker, playing a loudspeaker signal into a space; by the microphone, detecting audio in the space, to produce a feedback audio signal; estimating acoustic parameters for the space including a reverberation time and an ambient noise power based on the feedback audio signal and the loudspeaker signal; receiving an incoming audio signal that is not detected by the microphone; using the acoustic parameters, generating an acoustic watermark signal that, when played into the space through the loudspeaker, would be inaudible to a listener; adding the acoustic watermark signal to the incoming audio signal to produce a watermarked audio signal; and playing the watermarked audio signal into the space through the loudspeaker.

Example Embodiments

Figure 1:
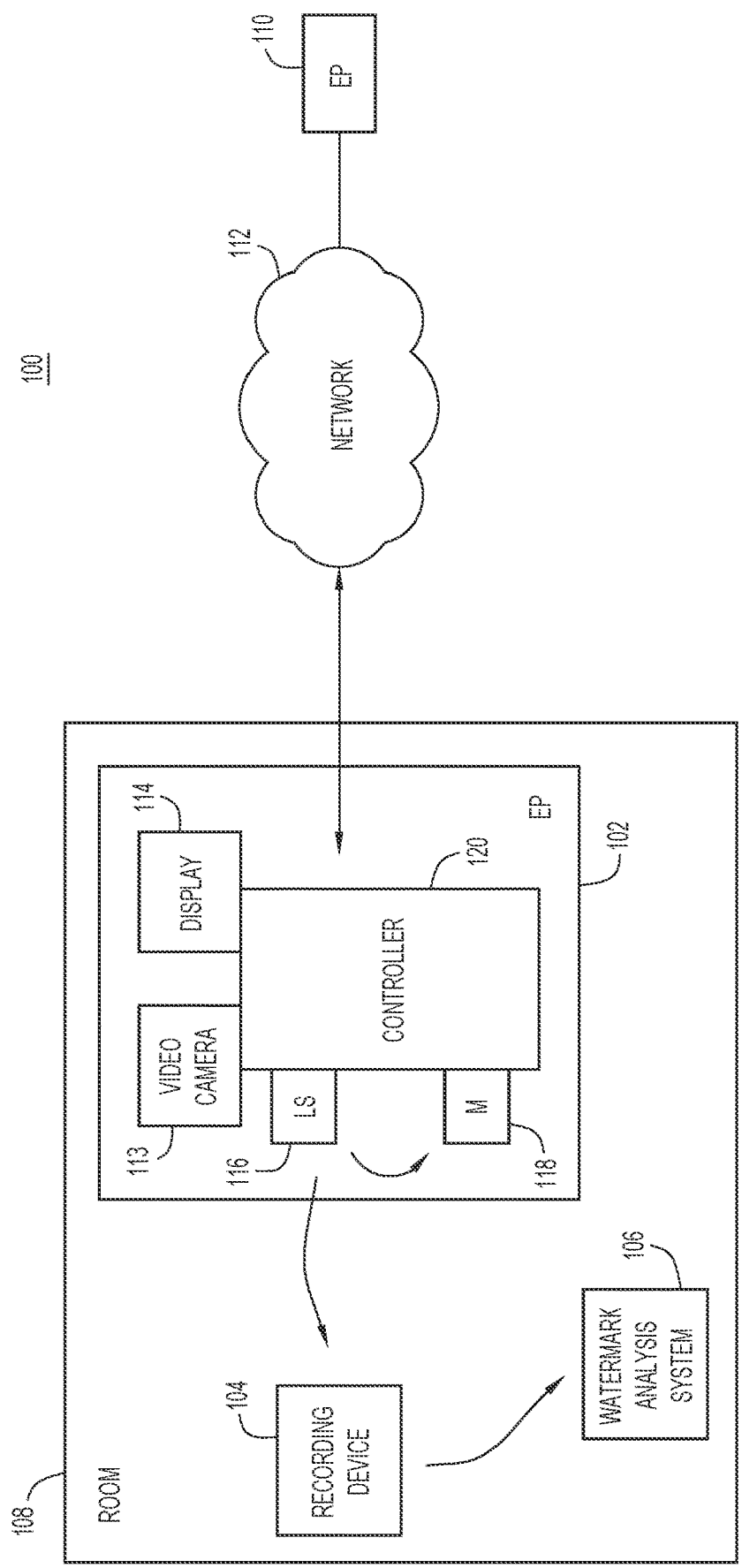
FIG. 1 is an illustration of a teleconferencing environment in which ambience-adapted audio watermarking embodiments may be implemented, according to an example embodiment.

With reference to FIG. 1, there is an illustration of an example teleconferencing environment 100 in which ambience-adapted audio watermarking embodiments may be implemented. Teleconferencing environment 100 includes a teleconference system or endpoint (EP) 102 (also referred to as an "endpoint device"), a recording device 104, and a watermark analysis system 106 deployed in a room 108 (or, more generally, any acoustic space). Endpoint 102 may be a wired and/or a wireless communication device, such as, but not limited to a laptop or tablet computer, a smartphone, a dedicated teleconference system, and the like. Endpoint 102 is configured to establish a teleconference collaboration session (e.g., an audio-visual conference) with a remote or far-end endpoint 110 over a network 112 to which both endpoints are connected. While the embodiments presented herein are described in the context of teleconferencing by way of example, the embodiments apply equally to other contexts, such as, but not limited to, audio, music, and video streaming. In some examples, the embodiments may embed a user-specific or user-device specific audio/acoustic watermark into streamed content to protect against unapproved content recording.

Endpoint 102 includes a video camera 113, a display 114, a loudspeaker (LS) 116, a microphone (M) 118 (e.g., a microphone array), and a controller 120 communicatively coupled to one another. In a transmit direction, endpoint 102 detects audio in room 108 using microphone 118, coverts the detected audio to audio packets, and streams the audio packets to far-end endpoint 110 over network 112. In a receive direction, endpoint 102 receives incoming audio packets that are streamed to the endpoint from far-end endpoint 110 over network 112, converts the received audio packets to incoming audio, generates an inaudible acoustic watermark, adds the acoustic watermark to the incoming audio to produce watermarked audio, and plays the watermarked audio into room 108 through loudspeaker 116. That is, loudspeaker 116 plays watermarked audio into room 108.

According to the embodiments presented herein, endpoint 102 executes a procedure that uses acoustic feedback between loudspeaker 116 and microphone 118 to derive acoustic parameters that acoustically characterize room 108, or more specifically an acoustic channel from the loudspeaker to the microphone. To do this, endpoint 102 plays audio into room 108 through loudspeaker 116, detects resulting audio in the room as feedback audio using microphone 118, and derives the acoustic parameters based on the feedback audio. Then, endpoint 102 generates the acoustic watermark based on the acoustic parameters. Endpoint 102 repeats the procedure using the watermarked audio as the acoustic feedback, in order to adapt characteristics of the acoustic watermark over time.

Recording device 104 detects the watermarked audio played through loudspeaker 116, and records the detected watermarked audio into storage. Recording device 104 provides the recorded/stored watermarked audio to watermark analysis system 106. Watermark analysis system 106 employs one or more audio decoders to detect and decode the watermark.

Figure 2:
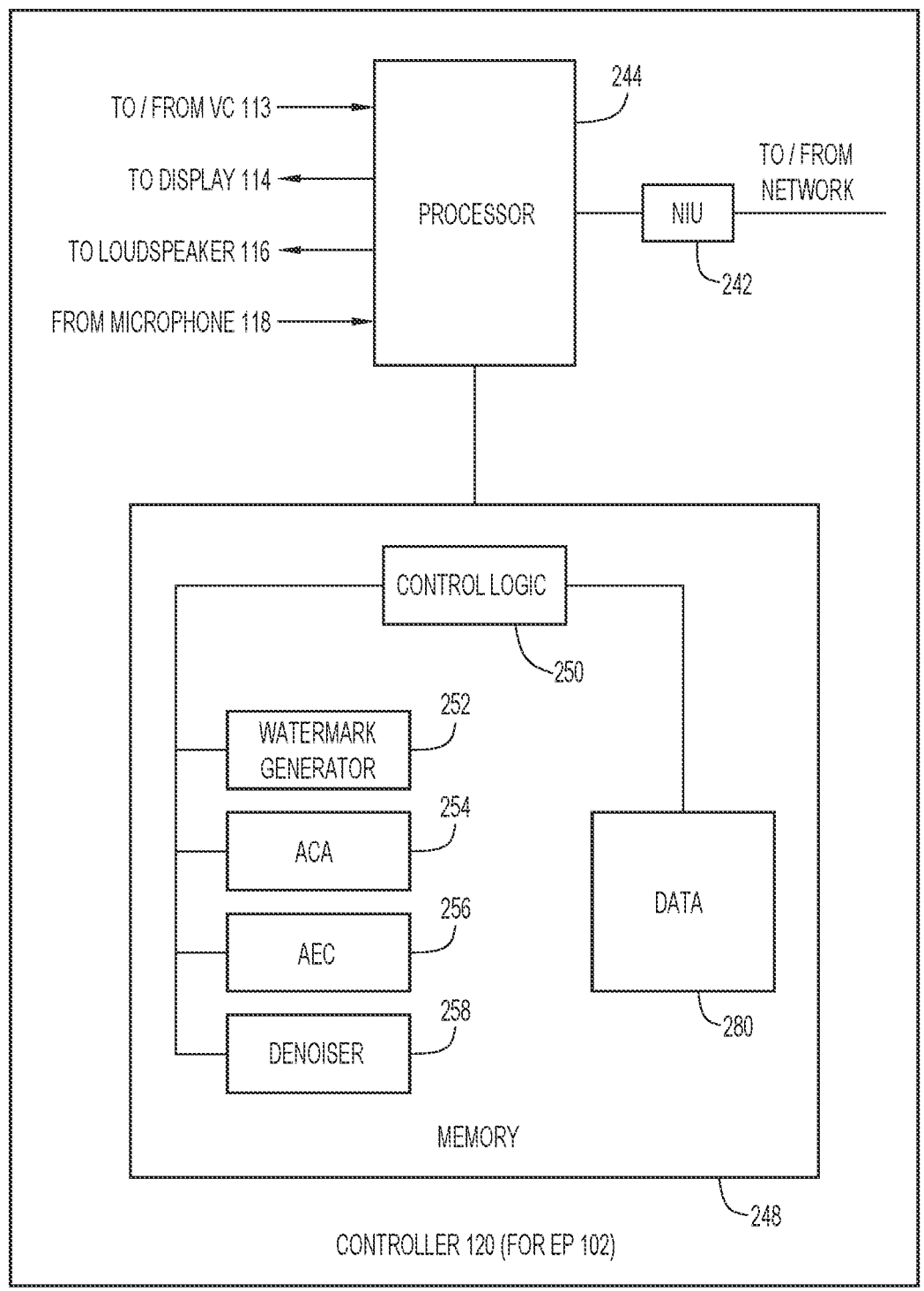
FIG. 2 is a block diagram of a controller of an endpoint in the teleconference environment, according to an example embodiment.

FIG. 2 is a block diagram of controller 120 of endpoint 102 according to an embodiment. There are numerous possible configurations for controller 120, and FIG. 2 is meant to be an example. Controller 120 provides overall control of endpoint 102. Controller 120 includes a network interface unit (NIU) 242, a processor 244, and memory 248. The aforementioned components of controller 120 may be implemented in hardware, software, firmware, and/or a combination thereof. NIU 242 is, for example, an Ethernet card or other interface device that allows the controller 120 to communicate over a communication network (e.g., network 112). NIU 242 may include wired and/or wireless connection capability.

Processor 244 may include a collection of microcontrollers and/or microprocessors, for example, each configured to execute respective software instructions stored in the memory 248. The collection of microcontrollers may include, for example: a video controller to receive, send, and process video signals related to display 114 and video camera 113; an audio processor to receive, send, and process audio signals related to loudspeaker 116 and microphone 118; and a high-level controller to provide overall control. Portions of memory 248 (and the instructions therein) may be integrated with processor 244.

In the transmit direction, processor 244 processes audio/video captured by microphone 118/video camera 113, encodes the captured audio/video into data packets, and causes the encoded data packets to be transmitted to the communication network. In the receive direction, processor 244 decodes audio/video from data packets received from the communication network and causes the audio/video to be presented via loudspeaker 116/display 114. As used herein, the terms "audio" and "sound" are synonymous and used interchangeably. Also, "voice" and "speech" are synonymous and used interchangeably.

The memory 248 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 248 may comprise one or more computer readable storage media (e.g., a memory device) encoded with software or instructions comprising computer executable instructions and when the software is executed (by the processor 244) it is operable to perform the operations described herein. For example, the memory 248 stores or is encoded with instructions for control logic 250 perform operations described herein.

Control logic 250 may include a watermark generator 252 that generates an acoustic watermark, an acoustic channel analyzer (ACA) 254 that analyzes audio detected by microphone 118, an acoustic echo canceler (AEC) 256 to cancel echo from the detected audio, and a denoiser 258 to reduce audio noise in the detect audio. Control logic 250 includes additional components described below.

In addition, memory 248 stores data 280 used and generated by control logic 250.

Figure 3:
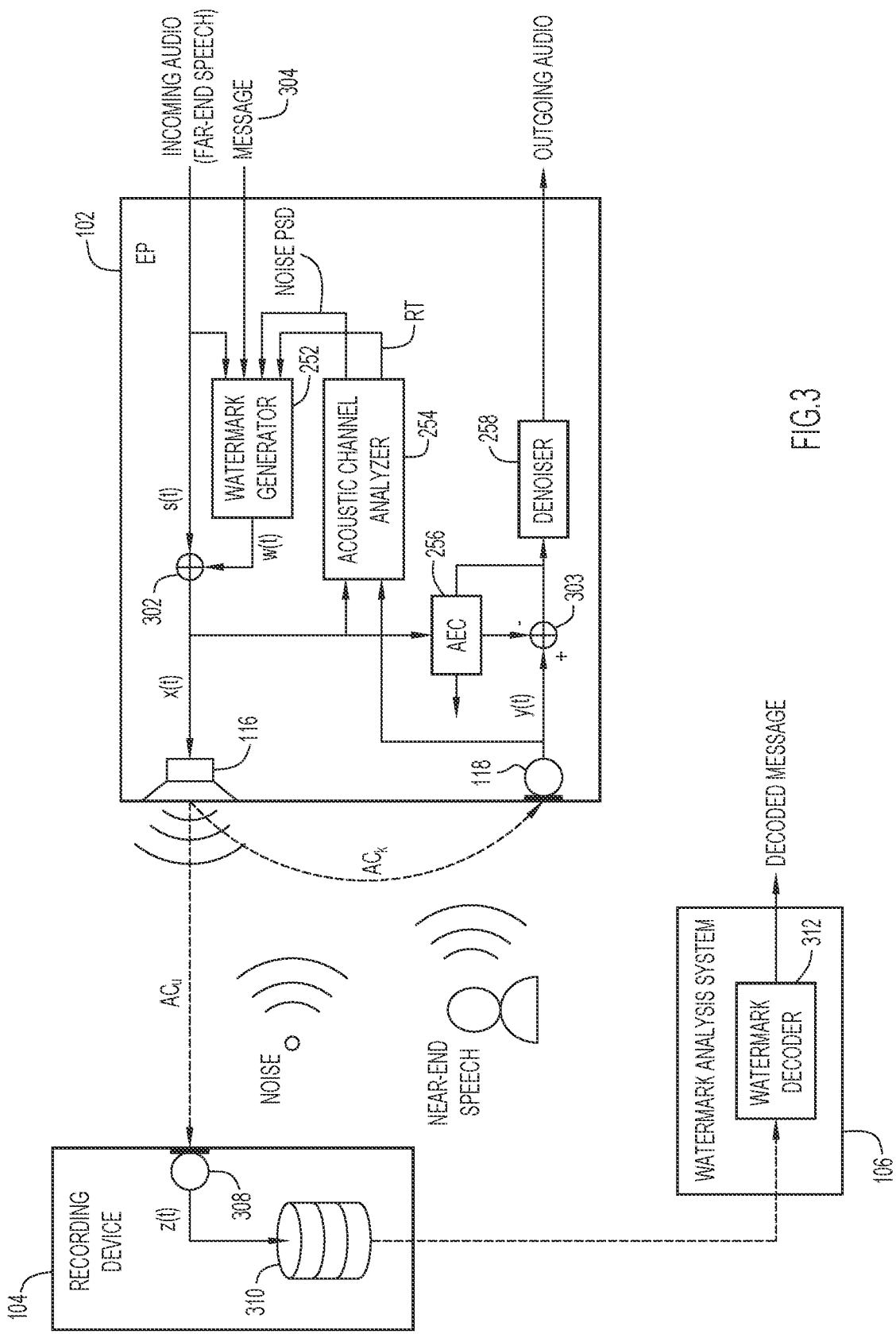
FIG. 3 is a block diagram expanding on each of the endpoint, a recording device, and a watermark analysis system of the teleconference environment, according to an example embodiment.

FIG. 3 is a block diagram expanding on each of endpoint 102, recording device 104, and watermark analysis system 106 as deployed in room 108, according to an embodiment. Endpoint 102 includes an adder 302 and a subtractor 303 in addition to the components described above in connection with FIG. 2. Loudspeaker 116 plays a loudspeaker signal x(t) (sometimes referred to as a "watermarked audio signal") into room 108. Microphone 118 detects audio/sound in room 108 to produce microphone signal y(t), and provides the same to subtractor 303 and ACA 254. AEC 256 derives an echo canceling signal based on loudspeaker signal x(t) and an echo canceled signal, and provides the echo canceling signal to subtractor 303. Subtractor 303 subtracts the echo canceling signal from microphone signal y(t) to produce the echo canceled signal, and provides the same to denoiser 258. Denoiser 258 reduces noise in the echo canceled signal to produce an outgoing audio signal to be transmitted to far-end endpoint 102. As used herein, the term "microphone signal" and "detected audio" may be used interchangeably.

ACA 254 receives loudspeaker signal x(t) and microphone signal y(t). ACA 254 performs an acoustic channel analysis for an acoustic channel in room 108 (from loudspeaker 116 to microphone 118) using microphone signal y(t) (as a feedback audio signal) and loudspeaker signal x(t), and generates/derives acoustic parameters that acoustically characterize the acoustic channel (and more generally the room), based on the acoustic channel analysis. For example, ACA 254 generates, as the acoustic parameters, estimates of an ambient noise power spectral density (PSD) (referred to simply as "ambient noise power") in room 108 and a reverberation time (RT) of the room. ACA 254 provides the acoustic parameters to watermark generator 252.

Watermark generator 252 receives the acoustic parameters, incoming audio signal s(t) received from far-end endpoint 110, and a message 304, which may include a bit sequence, for example. Watermark generator 252 estimates/derives a power level (i.e., a power) of incoming audio signal s(t) (e.g., of far-end speech present in the incoming audio signal). When endpoint 102 is engaged in a teleconference meeting, message 304 may include identifiers of the teleconference meeting and its participants, although the message may include other/additional information. Watermark generator 252 stores predetermined watermark modulation (WM) parameters (also referred to simply as "modulation parameters") for multiple (N) WM schemes (also referred to simply as "modulation schemes"). Each WM scheme defines a respective set of the WM parameters. Watermark generator 252 selects a particular WM scheme of the N WM schemes based on the acoustic parameters, including the estimates of the reverberation time and the ambient noise power.

Watermark generator 252 generates inaudible acoustic watermark signal w(t) that encodes message 304 using the selected WM scheme. For example, watermark generator 252 modulates a bit sequence (which may include message 304 and additional bits) based on particular WM parameters defined by the particular/selected WM scheme, to produce acoustic watermark signal w(t). In addition, watermark generator 252 adjusts/sets an amplitude or power level of acoustic watermark signal w(t) based on one or more of the ambient noise power and the power level (i.e., the power) of incoming audio signal s(t) (e.g., of far-end speech). Watermark generator 252 provides acoustic watermark signal w(t) to adder 302, which additionally receives incoming audio signal s(t). Adder 302 adds acoustic watermark signal w(t) to incoming audio signal s(t) to produce loudspeaker signal x(t) (i.e., the watermarked audio signal). Loudspeaker 116 plays loudspeaker signal x(t) into room 108 as watermarked audio that carries the watermark represented by acoustic watermark signal w(t).

In an example, watermark generator 252 may employ any known or hereafter developed spread spectrum modulation scheme as a WM scheme, such as direct sequence spread spectrum modulation, to generate acoustic watermark signal w(t) as an acoustic spread spectrum signal. The spread spectrum modulation scheme employs a spreading sequence of a given length to spread the above-mentioned bit sequence to encode the message 304 into the acoustic spread spectrum signal. The acoustic spread spectrum signal also includes a pilot having a pilot length for synchronization. Spread spectrum modulation parameters that may serve as WM parameters of the WM schemes include a length of the spreading sequence (and thus a length or time period of the acoustic watermark signal), an inter-symbol interval, a length of the pilot, a data rate, a coding rate for channel coding, and so on. The channel coding may include low density parity check (LDPC) coding, Reed-Solomon coding, Turbo coding, convolutional coding, and so on. In other examples, watermark generator 252 may employ non-spread spectrum modulation schemes to generate acoustic watermark signal w(t).

Recording device 104 includes a microphone 308 and storage 310. Once loudspeaker 116 of endpoint 102 transmits the watermarked audio into room 108, microphone 308 detects the watermarked audio to produce a microphone signal z(t), and provides the same to storage 310. Recording device 104 plays the recorded watermarked audio to watermark analysis system 106. Watermark analysis system 106 includes a watermark decoder 312 to receive the watermarked audio played by recording device 104, and to decode the watermark to recover message 304 as a decoded message.

As described above, endpoint 102 employs the loudspeaker 116, microphone 118, and ACA 254 to derive/estimate acoustic parameters that characterize the acoustic channel in room 108 from the loudspeaker to the microphone. More specifically, loudspeaker 116 plays loudspeaker signal x(t) into room 108, microphone 118 detects audio transmitted by the loudspeaker to produce microphone signal y(t) representative of "feedback audio," and ACA 254 derives/estimates the acoustic parameters based on the feedback audio and the loudspeaker signal. This is referred to as "estimating the acoustic channel." The estimates serve as a proxy for an acoustic channel from loudspeaker 116 to microphone 308 of recording device 104, for the following reasons.

Playing loudspeaker signal x(t) into the room 108 through loudspeaker 116 results in the following relevant acoustic channels in the room:

a. Acoustic channel $AC_u$ between loudspeaker 116 and microphone 308 of recording device 104.
b. Acoustic channel $AC_k$ between loudspeaker 116 and microphone 118 of endpoint 102.

The two acoustic channels can be summarized mathematically as follows:

$$AC_u: z(t) = x(t) * gu(t) + nu(t), \text{ and}$$

$$AC_k: y(t) = x(t) * gk(t) + nk(t), \text{ where:}$$

a. * denotes a convolution in time domain.
b. z(t) is the microphone signal produced by microphone 308 of recording device 104.
c. gu(t) is an impulse response of room 108 (i.e., a room impulse response) between loudspeaker 116 and microphone 308 of recording device 104.

d. nu(t) summarizes all near-end sounds (e.g., noise and near-end speech) that reach microphone 308 of recording device 104.
e. y(t) is the microphone signal produced by microphone 118 of endpoint 102.
f. gk(t) is a room impulse response between loudspeaker 116 and microphone 118 of endpoint 102. ACA 254 measures the room impulse response using any known or hereafter developed technique. The room impulse response provides an estimate of the reverberation time of the room.
g. nk(t) summarizes all near-end sounds captured/detected by microphone 118 of endpoint 102.

While AEC 256 provides an approximation of room impulse response (RIR), as is known, the techniques presented herein rely on an estimate of a length (i.e., RT) of the RIR. In one embodiment, in which AEC 256 is implemented as a linear time domain filter, linear filter coefficients of the AEC may be used to estimate RT, as is known. In that embodiment, AEC 256 may derive RT based on the linear filter coefficients and provide an indication of RT to ACA 254, or the ACA receives the linear filter coefficients from the AEC, and then derives an indication of RT based on the linear filter coefficients. In another embodiment, blind RIR estimation and derivation of RT can be performed on microphone signal y(t) directly, based on traditional signal processing or machine learning. This has an advantage of not using incoming audio s(t) (i.e., the far-end signal). That is, RT may be estimated when only near-end audio is present. In yet another embodiment, any known or hereafter developed signal processing technique may be used to derive RT based on loudspeaker signal x(t) and microphone signal y(t), without relying on acoustic echo cancellation.

For purposes of analysis, it is assumed that $AC_u$ is unknown, while $AC_k$ can be estimated from loudspeaker signal x(t) and microphone signal y(t) because they are available in endpoint 102. It is also assumed that $AC_u$ and $AC_k$ have the same interfering near-end sources (noise and a near-end speaker) and that their respective room impulse responses, although different, have similar reverberation times. Thus, $AC_k$ (or its properties) can be estimated as a surrogate or proxy for $AC_u$, which is the primary acoustic channel that affects decoding of the watermark from captured/recorded microphone signal z(t). Thus, watermark generator 252 uses estimates of $AC_k$ (i.e., the ambient noise power and reverberation time estimates) as a basis for (i) selecting the particular watermarking scheme, and (ii) amplifying acoustic watermark signal w(t) (i.e., setting the power level of the watermark), in order to facilitate decoding of the watermark from the watermarked audio by watermark decoder 312.

Ideally, watermark generator 252 generates acoustic watermark signal w(t) so that when it is played into room 108 by loudspeaker 116, the watermark as played into the room has (i) a maximum possible power level that is inaudible to a human listener given the estimate of the ambient noise power and the power of far-end speech present in incoming audio signal s(t) (i.e., such that the watermark is "just" masked by the combination of the noise in the room and the far-end speech), and (ii) sufficient energy to be detected quickly and reliably by watermark analysis system 106, given the power of the far-end speech and the ambient noise power in, and the reverberation time of, the room. For example, as the estimate of RT (and/or the estimate of at least one of the ambient noise power and the power of the far-end speech, when present) increases and decreases, watermark generator 252 selects different watermarking schemes that correspondingly result in increases and decreases in a total energy of the watermark. Increases and decreases in the total energy may result from increases and decreases in a length/time period (and thus energy) of the watermark, respectively. Such increases and decreases in the length/time period of the watermark may result from increases and decreases in one or more of the length of the spreading sequence, the inter-symbol interval, and the length of the pilot. In addition, as the estimates of the ambient noise power, specifically, increase and decrease, watermark generator 252 imparts a corresponding increase and decrease to the maximum power level of the watermark.

The following is an example of this:
a. When a first set of acoustic parameters indicates a first ambient noise power and a first RT, watermark generator 252 selects a first watermarking scheme to cause the watermark generator to generate the watermark signal with a first length/time period that will enable/facilitate detection of the watermark signal. Watermark generator 252 also sets the watermark power level to a first maximum power level that is just masked by the first ambient noise power and a first incoming audio signal power (when the watermark signal is played into the room through the loudspeaker).
b. When a second set of acoustic parameters indicates a second ambient noise power that is greater than the first ambient noise power and/or a second RT that is greater than the first RT, watermark generator 252 selects a second watermarking scheme to cause the watermark generator to generate the watermark signal with a second length that is greater than the first length. Watermark generator 252 also sets the watermark power level to a second maximum power level that is greater than the first maximum power level and this is just masked by the second ambient noise power and a second incoming audio signal power.

Figure 4:
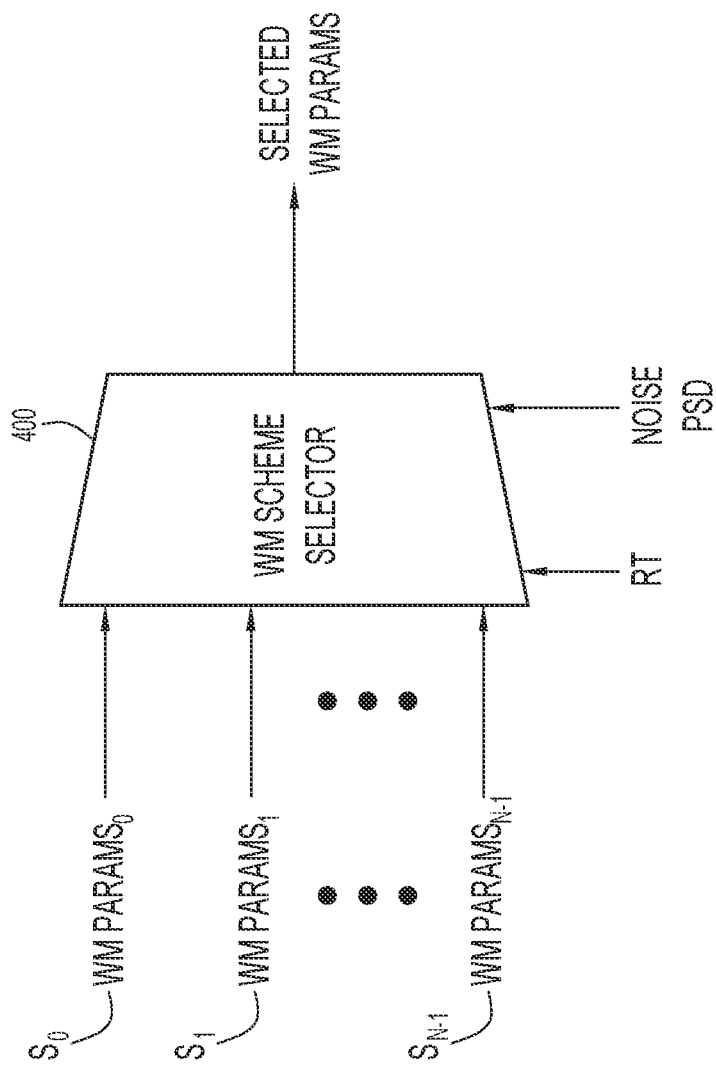
FIG. 4 is an illustration of a watermark modulation (WM) scheme selector employed by the endpoint to select a particular WM scheme, according to an example embodiment.

FIG. 4 is an illustration of an example WM scheme selector 400 employed by endpoint 102 to select a particular WM scheme. In the example of FIG. 4, WM scheme selector 400 receives, in parallel, N sets of selectable WM parameters $WM parameters_0$, $WM parameters_1$ .... $WM parameters_N$ for corresponding ones of N WM schemes $S_0$, $S_1$, ... $S_{N-1}$. In an example, the WM schemes include spread spectrum modulation schemes and the WM parameters include/define spread spectrum modulation parameters used to spread spectrum modulate a bit sequence (including, but not limited to, message 304). The spread spectrum modulation parameters may include the length of the spreading sequence, the inter-symbol guard interval, the data rate, the coding rate, the pilot length, and so on. In one example, the length, the inter-symbol guard interval, the data rate, and the coding rate each increases in an order: WM scheme $S_0$, $S_1$, $S_2$, and so on. Also, the spread spectrum modulation schemes may define spreading sequences that are orthogonal with respect to one another.

WM scheme selector 400 also receives from ACA 254, as selector control inputs, RT and ambient noise power (noise PSD) estimates. Based on the RT and ambient noise power estimates, WM scheme selector 400 selects for output particular WM parameters for a particular WM scheme to be used for generating acoustic watermark signal w(t). In the spread spectrum example, WM scheme selector 400 selects spread spectrum modulation parameters based on the RT and ambient noise power estimates. In this case, as one or both of the RT and the ambient noise power estimates increase and decrease, WM scheme selector 400 selects spread spectrum modulation parameters (e.g., the length of the spreading sequence, the inter-symbol interval, the data rate, and the coding rate) that correspondingly increase and decrease.

Figure 5:
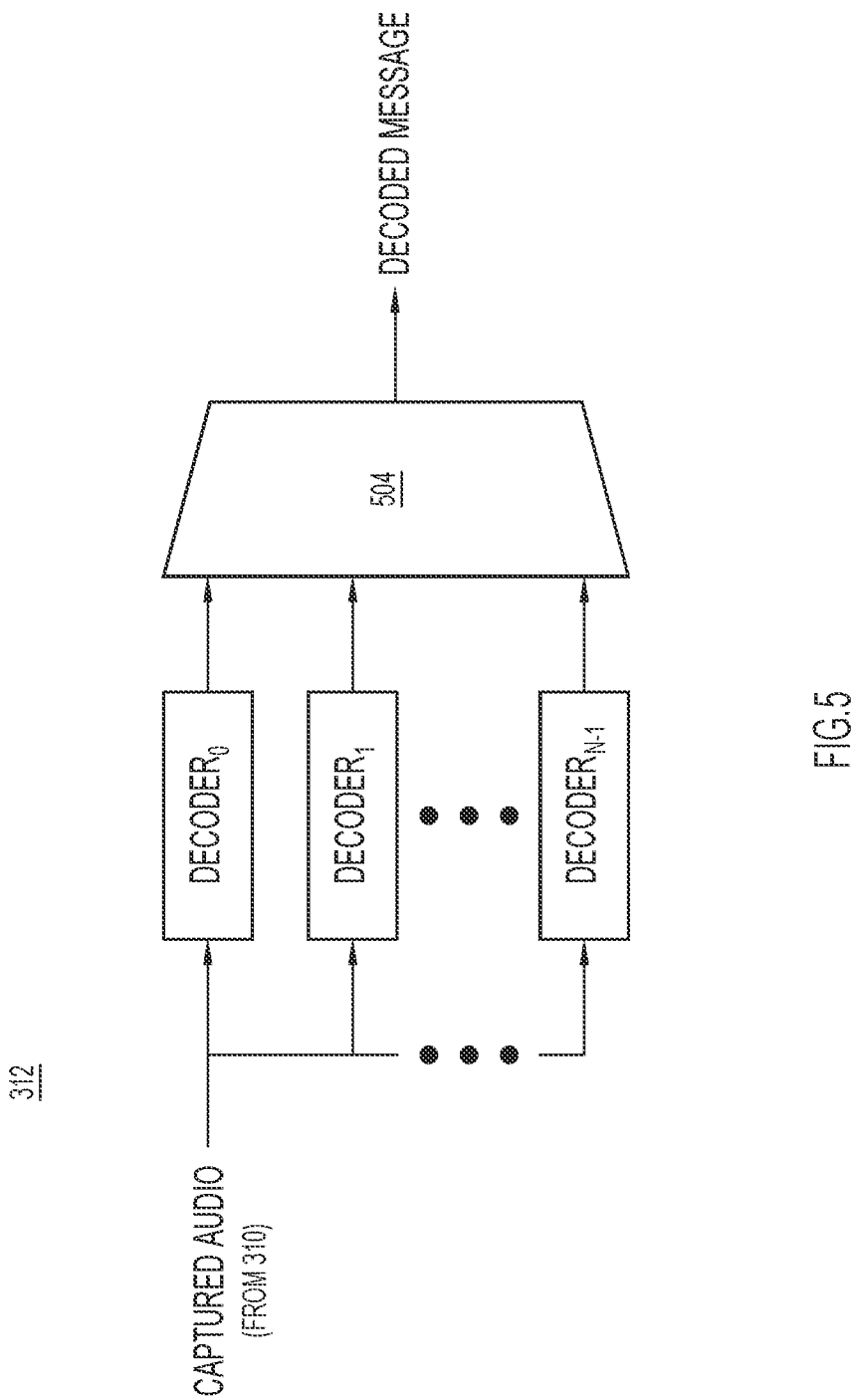
FIG. 5 is a block diagram of a watermark decoder of the watermark analysis system, according to an example embodiment.

FIG. 5 is a block diagram of watermark decoder 312 according to an embodiment. Watermark decoder 312 includes multiple decoders $decoder_0$, $decoder_1$, ... $decoder_{N-1}$ for corresponding ones of the multiple WM schemes $S_0$, $S_1$, ... $S_{N-1}$ that operate in parallel (concurrently) to decode watermarked audio (denoted "captured audio" in FIG. 5) provided to the watermark decoder by recording device 104. The multiple decoders provide respective results to a multiplexer 504. When the WM schemes are orthogonal, successful decoding occurs when only one of the decoders detects and decodes a message from the watermark, in which case multiplexer 504 outputs the decoded message to next stage processing.

Figure 6A:
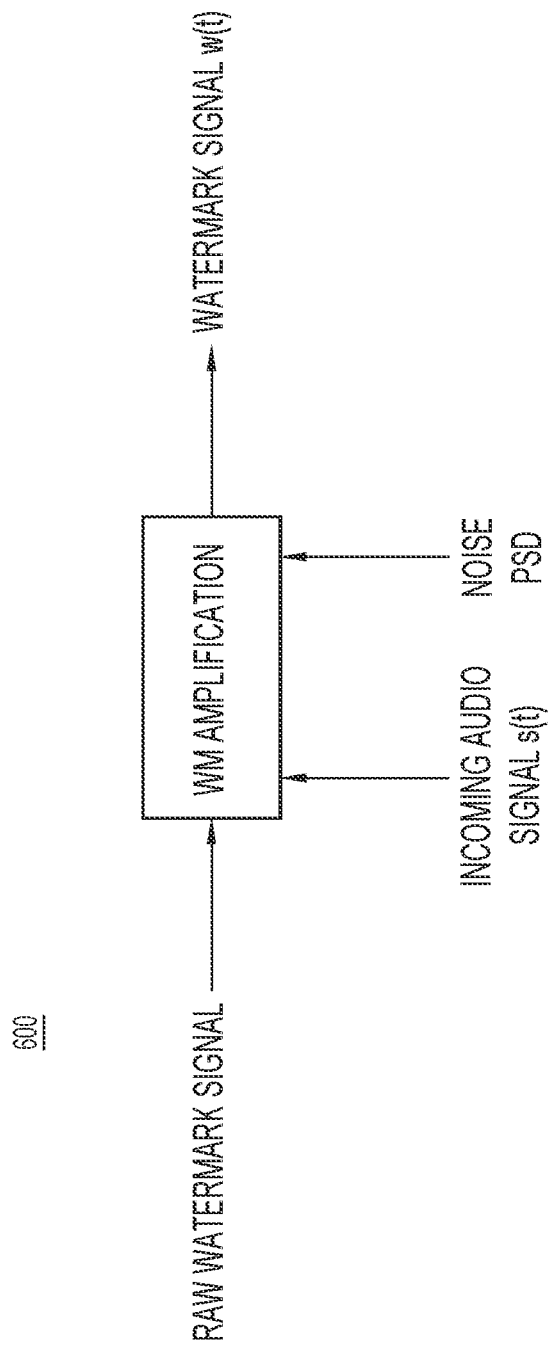
FIG. 6A is an illustration of a WM amplification scheme employed by the endpoint, according to an example embodiment.

FIG. 6A is an illustration of an example WM amplification scheme 600 employed by watermark generator 252 to set the power level of acoustic watermark signal w(t) before adding the same to incoming audio signal s(t). WM amplification scheme 600 receives a raw watermark signal including a bit sequence (i.e., a binary sequence), incoming audio signal s(t), and an estimate of the ambient noise power. WM amplification scheme 600 derives short-time spectra of incoming audio signal s(t) and the ambient noise power, and time-adaptively and frequency-adaptively amplifies the raw watermark signal based on the short-term spectra, to produce acoustic watermark signal w(t).

A goal of WM amplification scheme 600 is to set the power level of watermark signal w(t) at its maximum level that will still be masked/kept inaudible or imperceptible to a listener in the presence of speech and/or noise. When incoming audio signal s(t) is present, the incoming audio becomes the main contributor to a spectral masking threshold, which sets the maximum power level of acoustic watermark signal w(t). On the other hand, when incoming audio signal s(t) is not present, noise becomes the main contributor to the spectral masking threshold, which sets the maximum power level of acoustic watermark signal w(t). Any known or hereafter developed technique to estimate ambient noise power in room 108 based on microphone signal y(t) may be used. Any known or hereafter developed technique to derive the spectral masking threshold based on microphone signal y(t), with or without the presence of voice/speech, may be used. Two embodiments for estimating the ambient noise power are described briefly below.

A first embodiment used to estimate the ambient noise power performs voice activity detection (VAD) on microphone signal y(t) to detect near-end speech and performs VAD on incoming audio signal s(t) to detect far-end speech. The first embodiment estimates the ambient noise power on microphone signal y(t) only when the VAD indicates that both the near-end speech and the far-end speech are absent. Any known spectral estimation method can be used to derive the estimate of ambient noise power, including, but not limited to, periodogram or parametric methods based on autoregressive-moving average (ARMA) or line spectrum models.

A second embodiment used to estimate the ambient noise power employs a noise removal block (i.e., a speech denoiser) to derive the estimate of the ambient noise power based on traditional signal processing or machine learning. The second embodiment estimates the ambient noise power using an input to and an output from the noise removal block. For example, the second embodiment derives a statistic (e.g., a mean) for a residual (i.e., a difference between the input and the output) produced by the noise removal block and estimates the ambient noise power based on the statistic.

Techniques used to derive masking thresholds are now described briefly. Knowledge of ambient noise level, which in the best of cases entails the knowledge of the PSD of the ambient noise, can be beneficial. Intuitively speaking, the watermark, especially in the absence of audio activity in the incoming audio signal (absence of far-end speech), can have a higher power in a noisy environment than in silence, while keeping the watermark imperceptible. Higher emission power, when kept at a level at which the watermark remains imperceptible, adds to the robustness of the watermark decoding process.

FIGS. 6B-6E are illustrations of how the short-term spectrum of far-end speech (i.e., the speech spectrum) of the incoming audio signal and the PSD of ambient noise can be used to determine the frequency-dependent spectral mask used to spectrally shape the watermark before adding the same to the incoming audio signal, while keeping the watermark imperceptible. The computation of a masked threshold may use a psychoacoustic model. More specifically, FIGS. 6B-6E show how the speech spectrum can be combined with the noise PSD to derive the masked threshold, which can in turn serve as the frequency mask used to amplify the watermark while keeping the watermark inaudible.

Figure 6B:
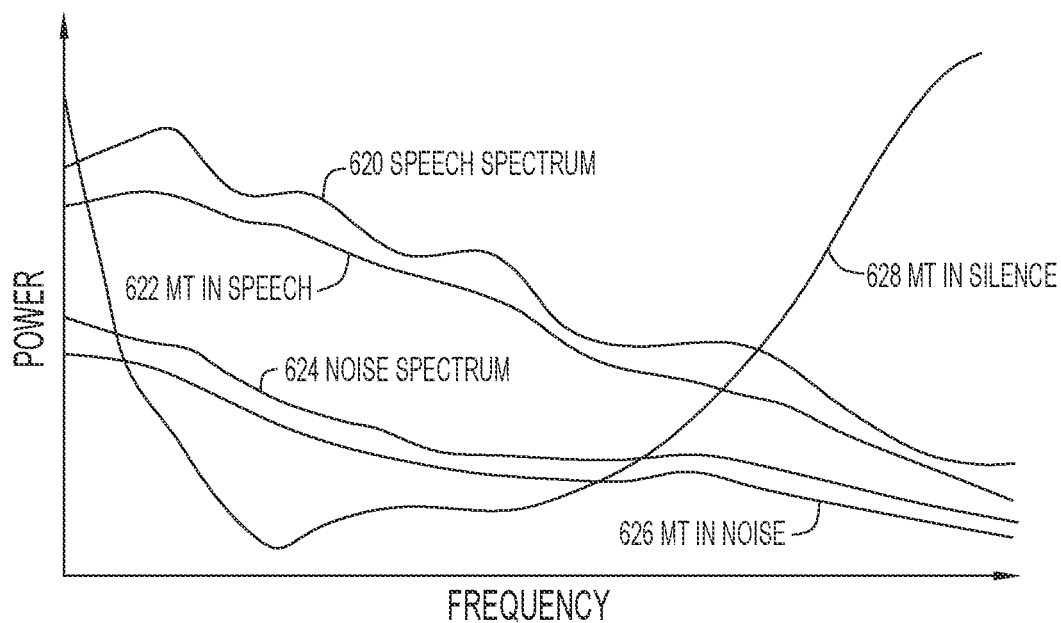
FIG. 6B shows audio spectra and masked thresholds when streamed audio or far-end speech is active, according to an embodiment.
Figure 6C:
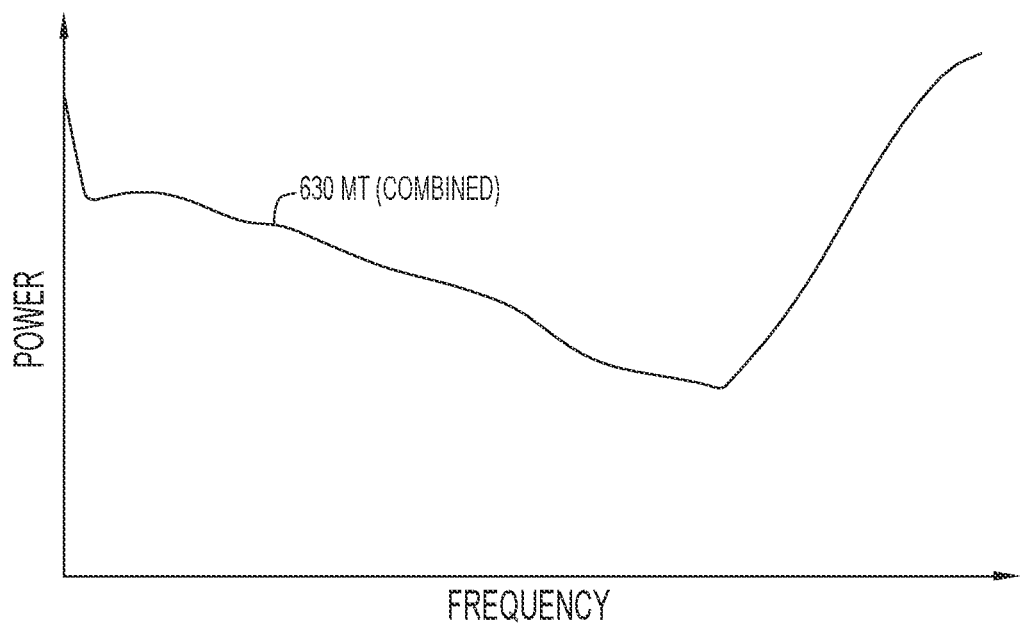
FIG. 6C shows a combined masked threshold based on the curves of FIG. 6B, according to an example embodiment.

FIGS. 6B and 6C show example audio spectra and masked thresholds when streamed audio/far-end speech in the incoming audio signal is active. FIG. 6B shows a speech spectrum 620, a masked threshold (MT) in speech 622 based on the speech spectrum, a noise spectrum 624, an MT in noise 626 based on the noise spectrum, and an MT in silence 628. FIG. 6C shows a (combined) MT 630 used to control the power of the watermark and that is based on the spectra (curves) of FIG. 6B. The main contributor to MT 630 is the far-end speech.

Figure 6D:
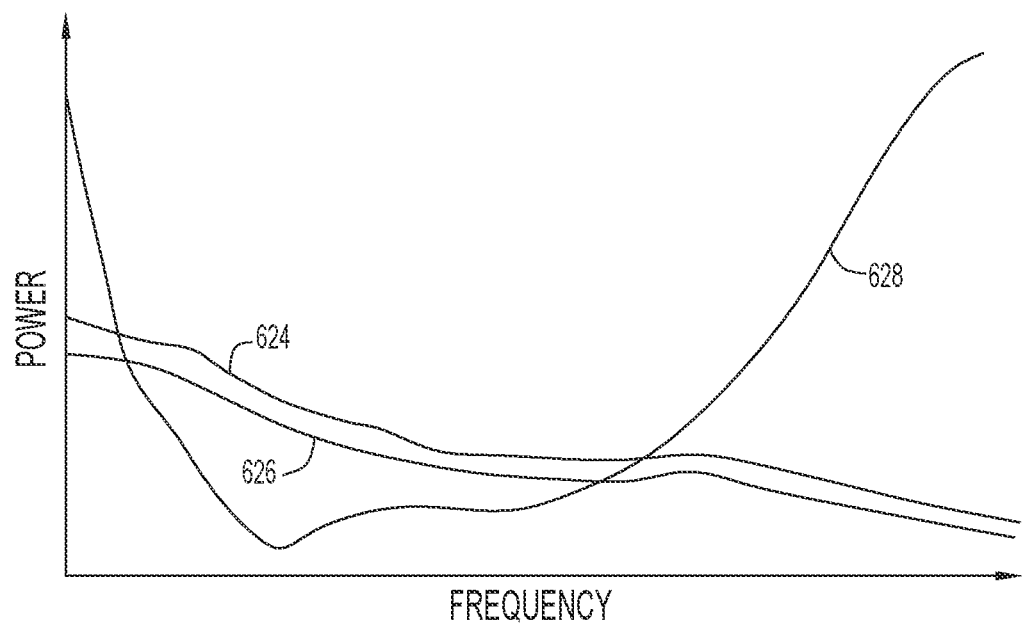
FIG. 6D shows audio spectra and masked thresholds when streamed audio or far-end speech is not active, according to an example embodiment.
Figure 6E:
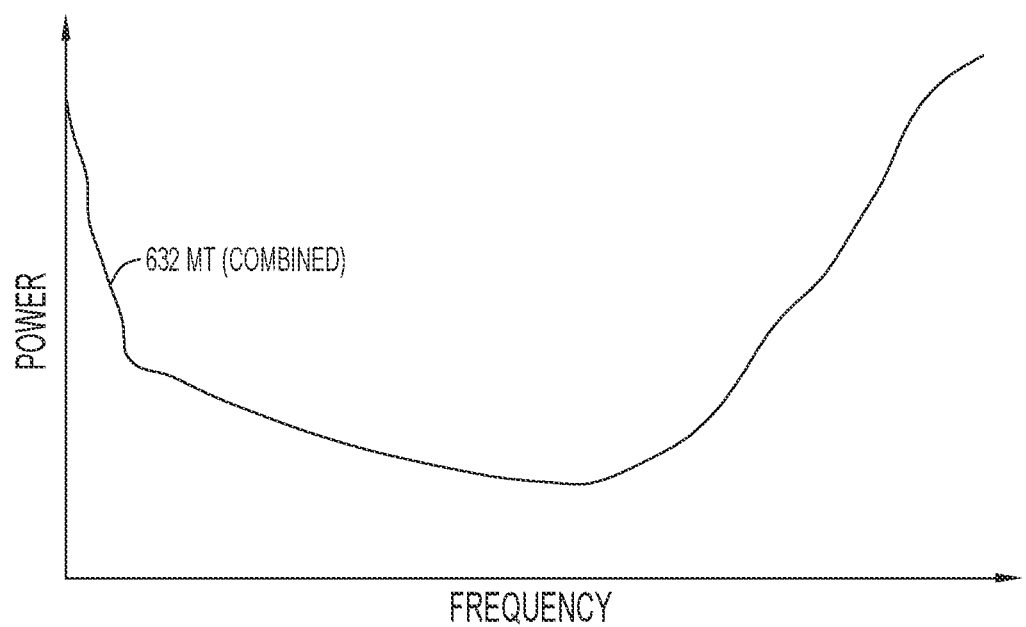
FIG. 6E shows a combined masked threshold based on the curves of FIG. 6D, according to an example embodiment.

FIGS. 6D and 6E show example audio spectra and masked thresholds when streamed audio/far-end speech is not active. FIG. 6D shows noise spectrum 624, MT in noise 626 based on the noise spectrum, and MT in silence 628. FIG. 6E shows a (combined) MT 632 used to control the power of the watermark and that is based on the spectra of FIG. 6D. The main contributor to MT 632 is the silence and the noise PSD.

Figure 7:
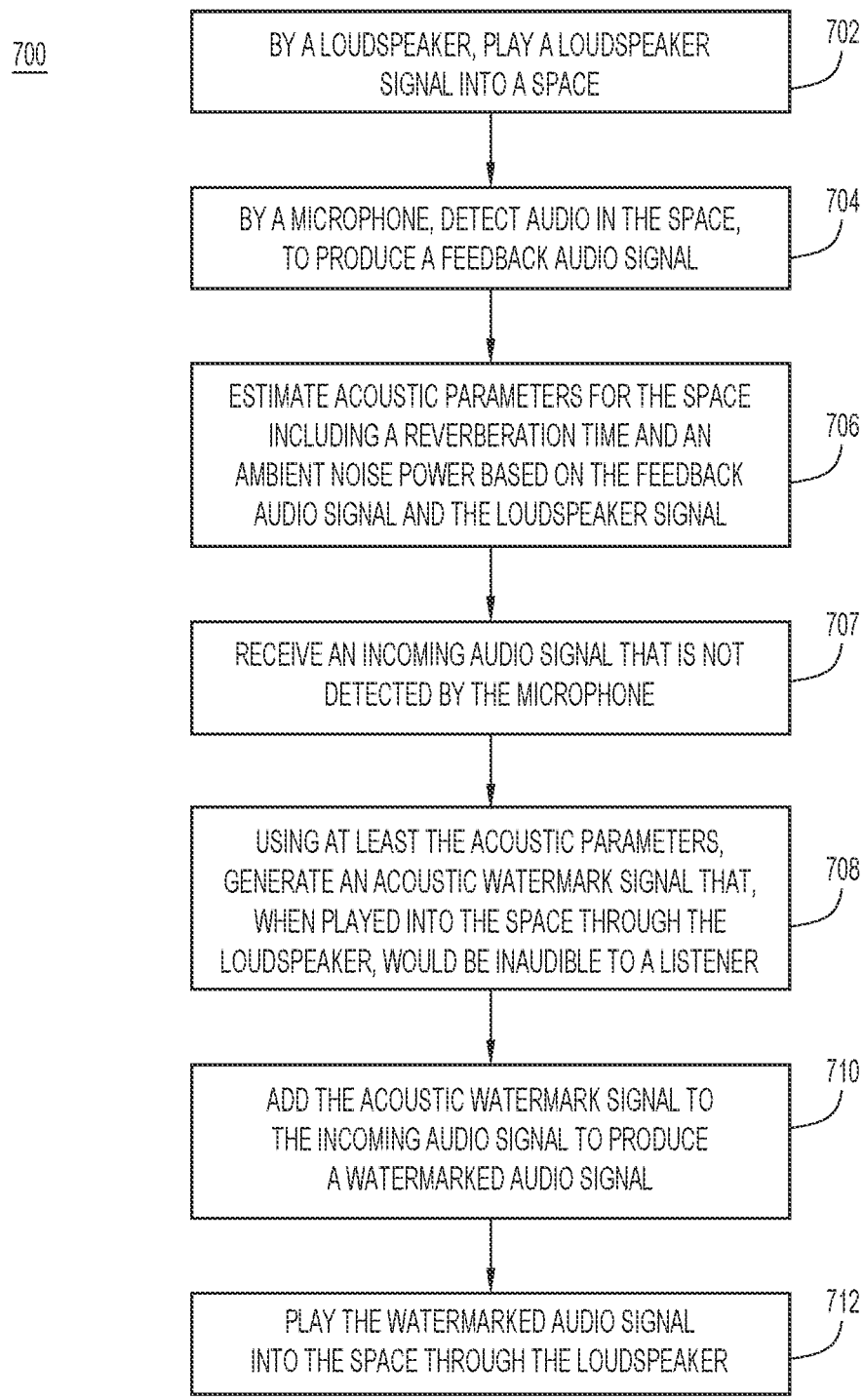
FIG. 7 is a flowchart of a method of performing ambience-adapted watermarking, according to an embodiment.

FIG. 7 is a flowchart of an example method 700 of performing ambience-adapted watermarking during a teleconference. Method 700 may be performed by an endpoint device deployed in a space (e.g., a room) and which includes a loudspeaker, a microphone and a controller coupled to the loudspeaker and the microphone.

At 702, the loudspeaker plays a loudspeaker signal into the space.

At 704, the microphone detects audio in the space (e.g., the loudspeaker signal that is played into the space and ambient noise), to produce a feedback audio signal (also referred to as a microphone signal).

At 706, the controller estimates acoustic parameters for an acoustic channel of the space from the loudspeaker to the microphone based on the feedback audio signal and the loudspeaker signal. This may be performed without performing echo cancelation on the feedback audio signal. The acoustic parameters include estimates of a reverberation time and an ambient noise power.

At 707, the controller receives an incoming audio signal that is not detected by the microphone. The controller may derive/recover the incoming audio signal from audio packets received from a far-end endpoint device over a network. The controller estimates a power of the incoming audio signal, which may include far-end speech.

Using at least the acoustic parameters, at 708, the controller generates an acoustic watermark signal that, when played into the space through the loudspeaker, would be inaudible/imperceptible to a listener. In an example, the controller generates the acoustic watermark signal by setting a power level of the acoustic watermark signal to a maximum power level possible that ensures that the acoustic watermark signal, when played through the loudspeaker, will be masked by the ambient noise power. In another example, the controller generates the acoustic watermark signal to have an increasing and decreasing length corresponding to an increasing and decreasing one of the reverberation time and the ambient noise power.

In another example, the controller uses the acoustic parameters and the power of the incoming audio signal as estimated to generate the acoustic watermark signal such that, when played into the space through the loudspeaker, the acoustic watermark signal would be inaudible/imperceptible to a listener. In this example, the controller sets the power level of the acoustic watermark signal to the maximum power level possible that ensures that the acoustic watermark signal, when played through the loudspeaker, will be masked by at least one of the ambient noise power and the power of the incoming audio signal (i.e., by the ambient noise power and/or the power of the incoming audio signal). The controller may generate the acoustic watermark signal to have an increasing and decreasing length corresponding to an increasing and decreasing one of the reverberation time and at least one of the ambient noise power and the power of the incoming audio signal (i.e., the ambient noise power and/or the power of the incoming audio signal).

In yet another example, the controller generates the acoustic signal by:
  a. Selecting spread spectrum modulation parameters (e.g., a length of a spreading sequence, an inter-symbol interval, a pilot length, a data rate, and a coding rate) from multiple sets of the spread spectrum modulation parameters based on the reverberation time and at least one of the ambient noise power and the power of the incoming audio signal.
  b. Spread spectrum modulating a bit sequence using the spread spectrum modulation parameters, to produce the acoustic watermark signal as an acoustic spread spectrum signal.

The spread spectrum modulation parameters define an energy level of the acoustic watermark signal as represented in the acoustic spread spectrum signal. In an example, the controller performs selecting the spread spectrum modulation parameters to increase and decrease the energy level of the acoustic watermark signal corresponding to an increase and a decrease in one or more of the reverberation time and at least one of the ambient noise power and the power of the incoming audio signal. For example, the selecting increases and decreases each of one or more of the length of the spreading sequence, the inter-symbol interval, the pilot length, the data rate, and the coding rate.

At 710, the controller adds the acoustic watermark signal to the incoming audio signal to produce a watermarked audio signal.

At 712, the controller causes the watermarked audio signal to be played into the space through the loudspeaker.

Method 700 repeats (for example, while playing watermarked audio signal x(t) into the space) to adapt characteristics of the acoustic watermark signal over time as the acoustic parameters change over time. Thus, method 700 dynamically adapts the modulation scheme used to generate the watermark and adapts the power level of the watermark based on estimated acoustic channel conditions, including reverberation time, the ambient noise power, and the power of the incoming audio signal.

Additionally, a recording device may record the watermarked audio played into the space. The recording device may provide the recorded watermarked audio to a watermark analysis system. The watermark analysis system may decode the watermarked audio provided by the recording device to recover the watermark.

Figure 8:
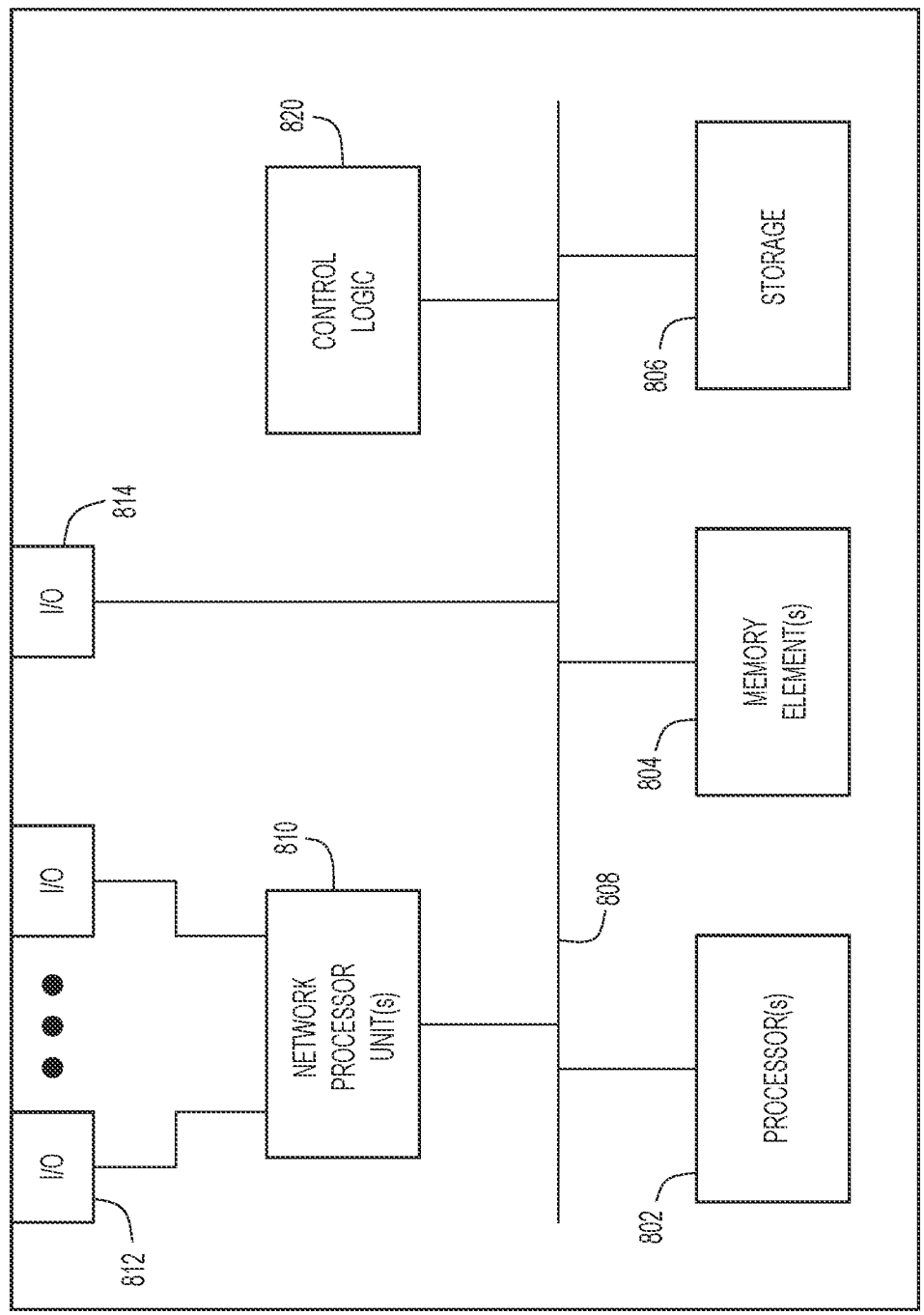
FIG. 8 illustrates a hardware block diagram of a computing device that may perform functions associated with operations discussed herein, according to an example embodiment.

Referring to FIG. 8, FIG. 8 illustrates a hardware block diagram of a computing device 800 that may perform functions associated with operations discussed herein in connection with the techniques depicted in FIGS. 1-7. In various embodiments, a computing device or apparatus, such as computing device 800 or any combination of computing devices 800, may be configured as any entity/entities as discussed for the techniques depicted in connection with FIGS. 1-7 in order to perform operations of the various techniques discussed herein. For example, computing device 800, or various components of the computing device, may represent endpoint 102, recording device 104, and/or watermark analysis system 106.

In at least one embodiment, the computing device 800 may be any apparatus that may include one or more processor(s) 802, one or more memory element(s) 804, storage 806, a bus 808, one or more network processor unit(s) 810 interconnected with one or more network input/output (I/O) interface(s) 812, one or more I/O interface(s) 814, and control logic 820. In various embodiments, instructions associated with logic for computing device 800 can overlap in any manner and are not limited to the specific allocation of instructions and/or operations described herein.

In at least one embodiment, processor(s) 802 is/are at least one hardware processor configured to execute various tasks, operations and/or functions for computing device 800 as described herein according to software and/or instructions configured for computing device 800. Processor(s) 802 (e.g., a hardware processor) can execute any type of instructions associated with data to achieve the operations detailed herein. In one example, processor(s) 802 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 804 and/or storage 806 is/are configured to store data, information, software, and/or instructions associated with computing device 800, and/or logic configured for memory element(s) 804 and/or storage 806. For example, any logic described herein (e.g., control logic 820) can, in various embodiments, be stored for computing device 800 using any combination of memory element(s) 804 and/or storage 806. Note that in some embodiments, storage 806 can be consolidated with memory element(s) 804 (or vice versa), or can overlap/exist in any other suitable manner.

In at least one embodiment, bus 808 can be configured as an interface that enables one or more elements of computing device 800 to communicate in order to exchange information and/or data. Bus 808 can be implemented with any architecture designed for passing control, data and/or information between processors, memory elements/storage, peripheral devices, and/or any other hardware and/or software components that may be configured for computing device 800. In at least one embodiment, bus 808 may be implemented as a fast kernel-hosted interconnect, potentially using shared memory between processes (e.g., logic), which can enable efficient communication paths between the processes.

In various embodiments, network processor unit(s) 810 may enable communication between computing device 800 and other systems, entities, etc., via network I/O interface(s) 812 (wired and/or wireless) to facilitate operations discussed for various embodiments described herein. In various embodiments, network processor unit(s) 810 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 800 and other systems, entities, etc. to facilitate operations for various embodiments described herein. In various embodiments, network I/O interface(s) 812 can be configured as one or more Ethernet port(s), Fibre Channel ports, any other I/O port(s), and/or antenna(s)/antenna array(s) now known or hereafter developed. Thus, the network processor unit(s) 810 and/or network I/O interface(s) 812 may include suitable interfaces for receiving, transmitting, and/or otherwise communicating data and/or information in a network environment.

I/O interface(s) 814 allow for input and output of data and/or information with other entities that may be connected to computing device 800. For example, I/O interface(s) 814 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 820 can include instructions that, when executed, cause processor(s) 802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 804 and/or storage 806 can store data, software, code, instructions (e.g., processor instructions), logic, parameters, combinations thereof, and/or the like used for operations described herein. This includes memory element(s) 804 and/or storage 806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities (which may be connected to each other directly or indirectly) utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In some aspects, the techniques described herein relate to a method including: at an endpoint device including a loudspeaker, a microphone, and a controller: by the loudspeaker, playing a loudspeaker signal into a space; by the microphone, detecting audio in the space, to produce a feedback audio signal; estimating acoustic parameters for the space including a reverberation time and an ambient noise power based on the feedback audio signal and the loudspeaker signal; receiving an incoming audio signal that is not detected by the microphone; using the acoustic parameters, generating an acoustic watermark signal that, when played into the space through the loudspeaker, would be inaudible to a listener; adding the acoustic watermark signal to the incoming audio signal to produce a watermarked audio signal; and playing the watermarked audio signal into the space through the loudspeaker.

In some aspects, the techniques described herein relate to a method, wherein: generating includes setting a power level of the acoustic watermark signal to a maximum power level possible that ensures that the acoustic watermark signal, when played through the loudspeaker, will be masked by at least one of the ambient noise power and a power of the incoming audio signal.

In some aspects, the techniques described herein relate to a method, wherein: generating includes generating the acoustic watermark signal to have an increasing and decreasing length corresponding to an increasing and decreasing one of the reverberation time and the ambient noise power.

In some aspects, the techniques described herein relate to a method, wherein: estimating includes estimating the acoustic parameters without performing echo cancelation on the feedback audio signal.

In some aspects, the techniques described herein relate to a method, wherein: generating includes generating the acoustic watermark signal to encode a message.

In some aspects, the techniques described herein relate to a method, wherein: generating includes generating the acoustic watermark signal as a spread spectrum signal using a spreading sequence and to include a pilot and an encoded message.

In some aspects, the techniques described herein relate to a method, wherein: generating further includes using the spreading sequence such that a length of the spreading sequence increases and decreases as at least one of the reverberation time and the ambient noise power increases and decreases.

In some aspects, the techniques described herein relate to a method, wherein generating includes: selecting spread spectrum modulation parameters from multiple sets of spread spectrum modulation parameters based on the reverberation time and the ambient noise power; and spread spectrum modulating a bit sequence using the spread spectrum modulation parameters, to produce the acoustic watermark signal as an acoustic spread spectrum signal.

In some aspects, the techniques described herein relate to a method, wherein: the spread spectrum modulation parameters define an energy level of the acoustic watermark signal as represented in the acoustic spread spectrum signal; and selecting includes selecting the spread spectrum modulation parameters to increase and decrease the energy level of the acoustic watermark signal corresponding to an increase and a decrease in at least one of the reverberation time and the ambient noise power, respectively.

In some aspects, the techniques described herein relate to a method, wherein: the spread spectrum modulation parameters include a length of a spreading sequence; and selecting includes selecting the spread spectrum modulation parameters such that the length of the spreading sequence increases and decrease as at least one of the reverberation time and the ambient noise power increases and decrease, respectively.

In some aspects, the techniques described herein relate to a method, wherein: the spread spectrum modulation parameters include an inter-symbol interval; and selecting includes selecting the spread spectrum modulation parameters such that the inter-symbol interval increases and decrease as the reverberation time increases and decrease, respectively.

In some aspects, the techniques described herein relate to a method, wherein: the spread spectrum modulation parameters include a data rate and a coding rate; and selecting further includes selecting the spread spectrum modulation parameters such that one or more of the data rate and the coding rate increases and decrease as the reverberation time increases and decrease, respectively.

In some aspects, the techniques described herein relate to a method, wherein: receiving includes receiving the incoming audio signal from a far-end endpoint device over a network.

In some aspects, the techniques described herein relate to an apparatus including: a loudspeaker to play a loudspeaker signal into a space; a microphone to detect audio in the space, to produce a feedback audio signal; and a controller coupled to the loudspeaker and the microphone and configured to perform: estimating acoustic parameters for the space including a reverberation time and an ambient noise power based on the feedback audio signal and the loudspeaker signal; receiving an incoming audio signal that is not detected by the microphone; using the acoustic parameters, generating an acoustic watermark signal that, when played into the space through the loudspeaker, would be inaudible to a listener; adding the acoustic watermark signal to the incoming audio signal to produce a watermarked audio signal; and causing the watermarked audio signal to be played by the loudspeaker into the space.

In some aspects, the techniques described herein relate to an apparatus, wherein: the controller is configured to perform generating by setting a power level of the acoustic watermark signal to a maximum power level possible that ensures that the acoustic watermark signal, when played through the loudspeaker, will be masked by at least one of the ambient noise power and a power of the incoming audio signal.

In some aspects, the techniques described herein relate to an apparatus, wherein: the controller is configured to perform generating by generating the acoustic watermark signal to have an increasing and decreasing length corresponding to an increasing and decreasing one of the reverberation time and the ambient noise power.

In some aspects, the techniques described herein relate to an apparatus, wherein the controller is configured to perform generating by: selecting spread spectrum modulation parameters from multiple sets of spread spectrum modulation parameters based on the reverberation time and the ambient noise power; and spread spectrum modulating a bit sequence using the spread spectrum modulation parameters, to produce the acoustic watermark signal as an acoustic spread spectrum signal.

In some aspects, the techniques described herein relate to a non-transitory computer readable medium encoded with instructions that, when executed by a processor of an endpoint device including a loudspeaker and a microphone, cause the processor to perform: causing the loudspeaker to play a loudspeaker signal into a space; receiving, from the microphone, audio detected in the space as a feedback audio signal; estimating acoustic parameters for the space including a reverberation time and an ambient noise power based on the feedback audio signal and the loudspeaker signal; receiving an incoming audio signal that is not detected by the microphone; using the acoustic parameters, generating an acoustic watermark signal that, when played into the space through the loudspeaker, would be inaudible to a listener; adding the acoustic watermark signal to the incoming audio signal to produce a watermarked audio signal; and causing the watermarked audio signal to be played by the loudspeaker into the space.

In some aspects, the techniques described herein relate to a non-transitory computer readable medium, wherein the instructions to cause the processor to perform generating include instructions to cause the processor to perform: generating includes setting a power level of the acoustic watermark signal to a maximum power level possible that ensures that the acoustic watermark signal, when played through the loudspeaker, will be masked by at least one of the ambient noise power and a power of the incoming audio signal.

In some aspects, the techniques described herein relate to a non-transitory computer readable medium, wherein the instructions to cause the processor to perform generating include instructions to cause the processor to perform: selecting spread spectrum modulation parameters from multiple sets of spread spectrum modulation parameters based on the reverberation time and the ambient noise power; and spread spectrum modulating a bit sequence using the spread spectrum modulation parameters, to produce the acoustic watermark signal as an acoustic spread spectrum signal.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

The above description is intended by way of example only. Various modifications and structural changes may be made therein without departing from the scope of the concepts described herein and within the scope and range of equivalents of the claims.

What is claimed is:

1. A method comprising:
at an endpoint device including a loudspeaker, a microphone, and a controller:
by the loudspeaker, playing a loudspeaker signal into a space;
by the microphone, detecting audio in the space, to produce a feedback audio signal;
estimating acoustic parameters for the space including a reverberation time and an ambient noise power based on the feedback audio signal and the loudspeaker signal;
receiving an incoming audio signal that is not detected by the microphone;
using the acoustic parameters, generating an acoustic watermark signal that, when played into the space through the loudspeaker, would be inaudible to a listener;
adding the acoustic watermark signal to the incoming audio signal to produce a watermarked audio signal; and
playing the watermarked audio signal into the space through the loudspeaker.

2. The method of claim 1, wherein:
generating includes setting a power level of the acoustic watermark signal to a maximum power level possible that ensures that the acoustic watermark signal, when played through the loudspeaker, will be masked by at least one of the ambient noise power and a power of the incoming audio signal.

3. The method of claim 1, wherein:
generating includes generating the acoustic watermark signal to have an increasing and decreasing length corresponding to an increasing and decreasing one of the reverberation time and the ambient noise power.

4. The method of claim 1, wherein:
estimating includes estimating the acoustic parameters without performing echo cancelation on the feedback audio signal.

5. The method of claim 1, wherein:
generating includes generating the acoustic watermark signal to encode a message.

6. The method of claim 1, wherein:
generating includes generating the acoustic watermark signal as a spread spectrum signal using a spreading sequence and to include a pilot and an encoded message.

7. The method of claim 6, wherein:
generating further includes using the spreading sequence such that a length of the spreading sequence increases and decreases as at least one of the reverberation time and the ambient noise power increases and decreases.

8. The method of claim 1, wherein generating includes:
selecting spread spectrum modulation parameters from multiple sets of spread spectrum modulation parameters based on the reverberation time and the ambient noise power; and
spread spectrum modulating a bit sequence using the spread spectrum modulation parameters, to produce the acoustic watermark signal as an acoustic spread spectrum signal.

9. The method of claim 8, wherein:
the spread spectrum modulation parameters define an energy level of the acoustic watermark signal as represented in the acoustic spread spectrum signal; and
selecting includes selecting the spread spectrum modulation parameters to increase and decrease the energy level of the acoustic watermark signal corresponding to an increase and a decrease in at least one of the reverberation time and the ambient noise power, respectively.

10. The method of claim 9, wherein:
the spread spectrum modulation parameters include a length of a spreading sequence; and
selecting includes selecting the spread spectrum modulation parameters such that the length of the spreading sequence increases and decrease as at least one of the reverberation time and the ambient noise power increases and decrease, respectively.

11. The method of claim 9, wherein:
the spread spectrum modulation parameters include an inter-symbol interval; and
selecting includes selecting the spread spectrum modulation parameters such that the inter-symbol interval increases and decrease as the reverberation time increases and decrease, respectively.

12. The method of claim 9, wherein:
the spread spectrum modulation parameters include a data rate and a coding rate; and
selecting further includes selecting the spread spectrum modulation parameters such that one or more of the data rate and the coding rate increases and decrease as the reverberation time increases and decrease, respectively.

13. The method of claim 1, wherein:
receiving includes receiving the incoming audio signal from a far-end endpoint device over a network.

14. An apparatus comprising:
a loudspeaker to play a loudspeaker signal into a space;
a microphone to detect audio in the space, to produce a feedback audio signal; and
a controller coupled to the loudspeaker and the microphone and configured to perform:
estimating acoustic parameters for the space including a reverberation time and an ambient noise power based on the feedback audio signal and the loudspeaker signal;
receiving an incoming audio signal that is not detected by the microphone;
using the acoustic parameters, generating an acoustic watermark signal that, when played into the space through the loudspeaker, would be inaudible to a listener;
adding the acoustic watermark signal to the incoming audio signal to produce a watermarked audio signal; and
causing the watermarked audio signal to be played by the loudspeaker into the space.

15. The apparatus of claim 14, wherein:
the controller is configured to perform generating by setting a power level of the acoustic watermark signal to a maximum power level possible that ensures that the acoustic watermark signal, when played through the loudspeaker, will be masked by at least one of the ambient noise power and a power of the incoming audio signal.

16. The apparatus of claim 14, wherein:
the controller is configured to perform generating by generating the acoustic watermark signal to have an increasing and decreasing length corresponding to an increasing and decreasing one of the reverberation time and the ambient noise power.

17. The apparatus of claim 14, wherein the controller is configured to perform generating by:
selecting spread spectrum modulation parameters from multiple sets of spread spectrum modulation parameters based on the reverberation time and the ambient noise power; and
spread spectrum modulating a bit sequence using the spread spectrum modulation parameters, to produce the acoustic watermark signal as an acoustic spread spectrum signal.

18. A non-transitory computer readable medium encoded with instructions that, when executed by a processor of an endpoint device including a loudspeaker and a microphone, cause the processor to perform:
causing the loudspeaker to play a loudspeaker signal into a space;
receiving, from the microphone, audio detected in the space as a feedback audio signal;
estimating acoustic parameters for the space including a reverberation time and an ambient noise power based on the feedback audio signal and the loudspeaker signal;
receiving an incoming audio signal that is not detected by the microphone;

using the acoustic parameters, generating an acoustic watermark signal that, when played into the space through the loudspeaker, would be inaudible to a listener;

adding the acoustic watermark signal to the incoming audio signal to produce a watermarked audio signal; and causing the watermarked audio signal to be played by the loudspeaker into the space.

19. The non-transitory computer readable medium of claim 18, wherein the instructions to cause the processor to perform generating include instructions to cause the processor to perform:

generating includes setting a power level of the acoustic watermark signal to a maximum power level possible that ensures that the acoustic watermark signal, when played through the loudspeaker, will be masked by at least one of the ambient noise power and a power of the incoming audio signal.

20. The non-transitory computer readable medium of claim 18, wherein the instructions to cause the processor to perform generating include instructions to cause the processor to perform:

selecting spread spectrum modulation parameters from multiple sets of spread spectrum modulation parameters based on the reverberation time and the ambient noise power; and spread spectrum modulating a bit sequence using the spread spectrum modulation parameters, to produce the acoustic watermark signal as an acoustic spread spectrum signal.

* * * * *